(No Model.)
F. J. STAFFORD.
CAR STARTER AND BRAKE.
No. 464,111. Patented Dec. 1, 1891.
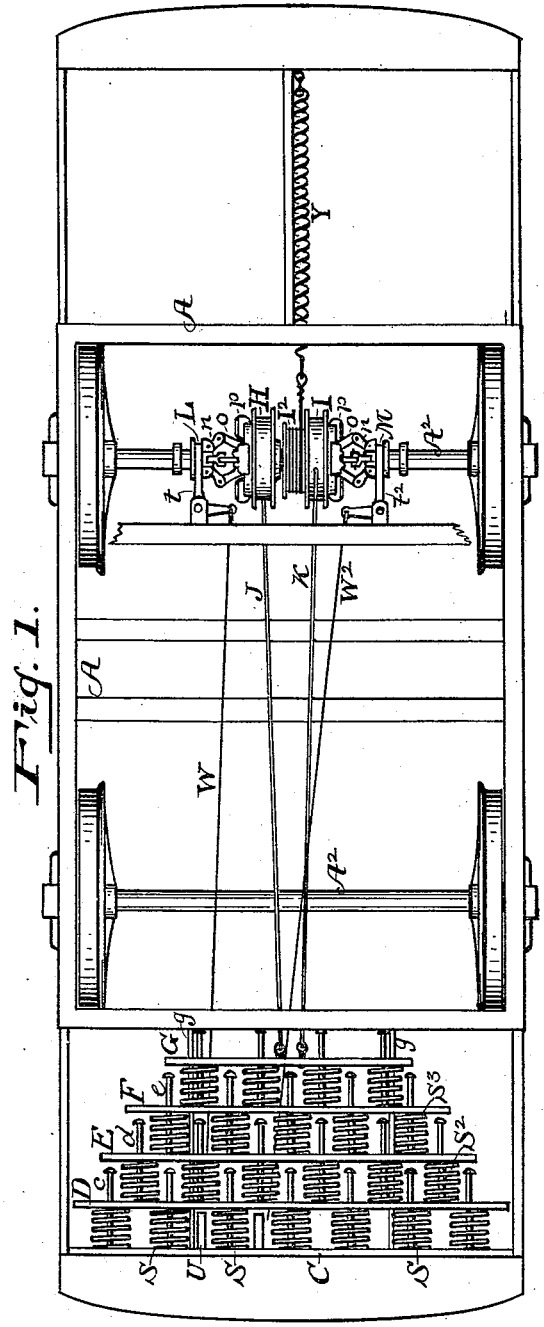
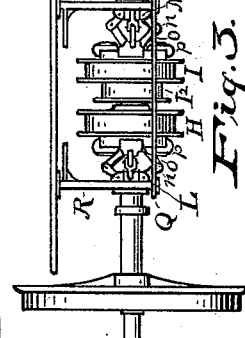
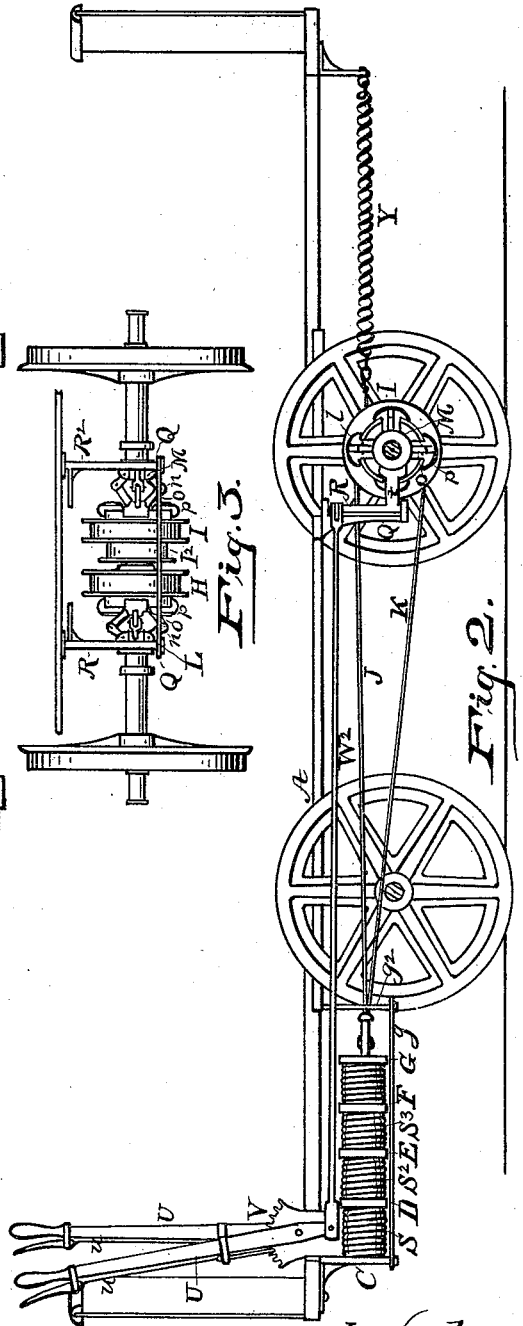
Witness,
H. H. Barnes
E. Jay Pinney
Inventor,
Frank J. Stafford.
By Geo. W. Tibbitts, Atty.

UNITED STATES PATENT OFFICE.

FRANK J. STAFFORD, OF CLEVELAND, OHIO.

CAR STARTER AND BRAKE.

SPECIFICATION forming part of Letters Patent No. 464,111, dated December 1, 1891.

Application filed March 2, 1891. Serial No. 383,511. (No model.)

*To all whom it may concern:*

Be it known that I, FRANK J. STAFFORD, a citizen of the United States, residing at Cleveland, in the county of Cuyahoga and State of Ohio, have invented certain new and useful Improvements in Car Braking and Starting, of which the following is a specification.

This invention relates to the stopping and starting of street-cars, and has for its object to provide a mechanism whereby the momentum of the car is utilized as a force for checking and stopping a car, and at the same time transferring said force to a set of springs, and reserved for use in again aiding in setting the car in motion; and it consists in the novel constructions and combinations of mechanism for accomplishing such results, substantially as hereinafter described, and pointed out in the claims.

In the accompanying drawings, Figure 1 is a top or plan view of a car frame and truck having my improved mechanism attached. Fig. 2 is a longitudinal section of the same. Fig. 3 is a cross-section showing clutch-braking and starting mechanism on the axle.

A represents the frame-work of a car floor and platforms, and $A^2$ are the axles.

Beneath the front platform I provide a set of springs of suitable strength and power, substantially as follows: C represents a strong plate having brackets firmly bolted to the cross-head of the platform, to which are attached rods $c\ c$, surrounding which are stiff spiral springs S S. One end of each spring is secured to the said plate. D is a perforated bar, through whose perforations the said rods $c\ c$ extend. The ends of the springs are also secured to this bar D. To this bar are also fixed rods $d\ d$, and they are surrounded with springs $S^2$, which are secured between this and the bar E in like manner to the springs S. The bar E is similarly provided with rods $e\ e$ and springs $S^3$. A third bar F is similarly provided with rods and springs connected with bar E, and a fourth bar G is attached to the rods and springs of bar F. This terminates the series of springs. The rows of springs are diminished in number from C to G, thereby gradually decreasing the tension of springs from C to G, thus making the first resistance of the springs less than later, so as to make a gradual or increased resistance when drawing out the springs. $g\ g$ are rods or bars extending from the lower edge of plate C back to and supported by suitable hanger-rods $g^2$, upon which the bars D E F G are supported and ride in the movements of the springs. On the rear axle are placed two loose wheels or pulleys H I, each of which are connected to the aforesaid spring by cables J K, and connected with each of said pulleys or wheels is a suitable clutch mechanism to be operated by the driver on the front platform. The clutch mechanism shown consists of sleeves L M, fixed on the axle with a feather, so as to be moved longitudinally thereon, but will rotate with the axle. To the said sleeves are provided arms $l\ m$, and links, lever, and jaws $u\ o\ p$ for gripping the rims of said wheels H I for rotating them when required. Q is a depending frame attached to a cross-beam of the car frame or truck, hanging in front of said wheels and clutches. R $R^2$ are upright turn posts or shafts journaled in said frame Q, having crank-arms $r\ r^2$ near their upper ends and crank-arms $t\ t^2$ near their lower ends and connected with the sleeves L M of the clutch mechanism. To the front platform are provided two hand-levers U U, having latch attachments $u\ u$ and a segmental rack V for holding them. The lower ends of said levers are connected by connecting-rods W $W^2$ with the crank-arms $r\ r^2$ on the turn-posts R $R^2$, by means of which the clutches may be readily moved for gripping the wheels or releasing them. To the wheel I is provided a spool $I^2$, upon which is wound a rope oppositely to the cable K and is connected to a spring Y, the other end of which is attached to a cross-beam or other suitable support of the truck or frame, the use of which will hereinafter appear.

The operation of this mechanism is as follows: For stopping the car the operator pulls over the right-hand lever U, causing the clutch to grip the wheel H, which at once begins to rotate, drawing on the cable J and pulling on the springs under the platform, thereby checking the further movement of the car and soon stopping it. At the same time the cable K is slacked up, and the slack is wound upon the pulley I by the spring Y pulling on its rope, rotating the wheel I and winding up the slack of cable K onto said pulley I. The pulley, being loose, readily yields to the pull of the spring Y. Now to aid in setting the car moving again the left-hand lever U is pulled over for setting the clutch M; then the right-hand lever U is thrown forward again, thereby releasing the clutch L and setting the pulley H free; now the springs under the platform pull upon the cable K and rotate the axle; then the left-hand lever U is again thrown forward as soon as the springs have retracted, and both the pulleys H and I are free, and the car may be propelled onward until it is required to again stop the car.

The great advantage derived from the use of this mechanism is the saving of the motive power and the motor mechanism. The greatest strain on the motors is in starting from a dead stop, which this device entirely relieves the motor of, and enabling the dispensing with one of the motors to a car, as nearly all now have to carry two motors to provide for emergencies.

Having described my invention, what I claim is—

1. A power-storing mechanism for cars, consisting of a plate firmly attached to a sill or cross-head of car frame or platform, perforated parallel bars connected by rods with said plate, and springs surrounding said rods interposed between the bars and connected thereto, capable of expansion and contraction, substantially as described.

2. A car provided with a power-storing mechanism, consisting of a series of springs interposed and fixed between transverse perforated bars, rods connecting said bars in conjunction with the springs, cables connecting said power-storing mechanism with loose pulleys on the car-axle, and means for setting said pulleys, whereby power may be transferred to and from said spring mechanism, substantially as and for the purpose specified.

FRANK J. STAFFORD.

Witnesses:
GEO. W. TIBBITTS,
WM. K. KIDD.